United States Patent [19]

Miyauchi

[11] 3,721,754

[45] March 20, 1973

[54] METHODS AND APPARATUS FOR RECORDING SIGNALS

[75] Inventor: Sakae Miyauchi, Tokyo, Japan

[73] Assignee: Nihon Denshi Kabushiki Kaisha, Tokyo, Japan

[22] Filed: July 9, 1971

[21] Appl. No.: 161,186

[52] U.S. Cl...........................178/5.4 CD, 178/6.7 A
[51] Int. Cl..............................................H04n 5/86
[58] Field of Search............178/6.7 A, 5.4 CD, 5.2 A

[56] References Cited

UNITED STATES PATENTS 3,571,503   3/1971   McMann, Jr. .......................178/6.7 A Primary Examiner—Howard W. Britton
Attorney—William H. Webb et al.

[57] ABSTRACT

Methods and apparatus for recording a plurality of dissimilar signals such as the brightness, color and sound signals forming part of television signals, said signals being simultaneously generated by a generating means, said signals then being respectively memorized by individual memories and read out in accordance with a predetermined order, said read out signals being applied to the control electrode of an electron beam recorder in order to modulate the beam intensity, said signals then being finally recorded in monochrome on a radiant energy sensitive recording medium, and recorded at different positions on the recording medium in transverse formation.

6 Claims, 3 Drawing Figures

METHODS AND APPARATUS FOR RECORDING SIGNALS

This invention relates broadly to methods and apparatus for recording a plurality of dissimilar signals in monochrome on an elongated radiant energy sensitive recording medium. More specifically, it relates to methods and apparatus for recording a plurality of dissimilar signals simultaneously generated by a generating means on a radiant energy sensitive recording medium at different positions in transverse formation.

The recording of a television color picture information signal on a radiant energy sensitive medium such as photographic film in the form of numerous parallel monochrome lines by the use of radiant energy beams is a well-known process. In this case, the color picture information signal is separated into brightness and color signals and the signals are recorded by means of an electron beam recorder equipped with beam producing columns arranged along the recording medium in transverse formation. However, since each signal requires a separate column, the recorder cannot be kept compact.

Furthermore, since the arrangement of plural columns for directing the electron beams toward a different part of the radiant energy sensitive recording medium at a short distance is restricted by column size. The columns of necessity have to be inclined with respect to the normal line of the medium.

As a result, the electron beams become distorted which adversely affect the recording accuracy.

An object of this invention is to eliminate the above defects by providing a method and apparatus for recording a plurality of dissimilar signals at different positions on a radiant energy sensitive recording medium in transverse formation using only one radiant energy beam.

Another object of this invention is to provide a method and apparatus for recording a plurality of dissimilar signals at different positions on an elongated recording medium such as photographic film in transverse formation using only one radiant energy beam.

A further object of this invention is to provide a method and apparatus for recording the brightness and color components of a television signal at different positions on an elongated recording medium in transverse formation using only one radiant energy beam.

A still further object of this invention is to provide a method and apparatus for recording the brightness, color and sound components of a television signal at different positions on an elongated recording medium in transverse formation using only one radiant energy beam.

Briefly, according to this invention, there is provided a method and suitable apparatus for practicing a method of recording a plurality of dissimilar but simultaneously generated signals. The dissimilar signals are recorded at different positions on an elongate radiant energy sensitive recording medium (for example, photographic tape) in transverse formation. The method comprises periodically scanning a radiant energy beam across the medium, for example, tape, in a direction transverse to the direction of movement of the medium. The intensity of the radiant energy beam is controlled by the following steps: First, a plurality of signals comprising one set of dissimilar signals are stored in a plurality of memories. The signals would comprise, for example, all the signals comprising the brightness signal or the color difference signals of a conventional color television camera. The number of memories must correspond to the number of signals comprising the said set of dissimilar signals in one line scan. Thereafter, the stored signals are sequentially read out to control the intensity of the radiant energy beam.

In a preferred embodiment, different dissimilar signals, for example, the brightness signal and the color difference signals are stores in different sets of memories. In this embodiment, signals corresponding to one of the dissimilar signals, for example, the brightness signal, are generated during the read out time of the stored signals of a different set of dissimilar signals, for example, the color difference signals. Thereafter, the procedure is reversed so that the sets of memories alternately store or read out dissimilar signals.

This invention will be more readily understood by reading the following detailed description in conjunction with the accompanying drawings in which.

Figure 1:
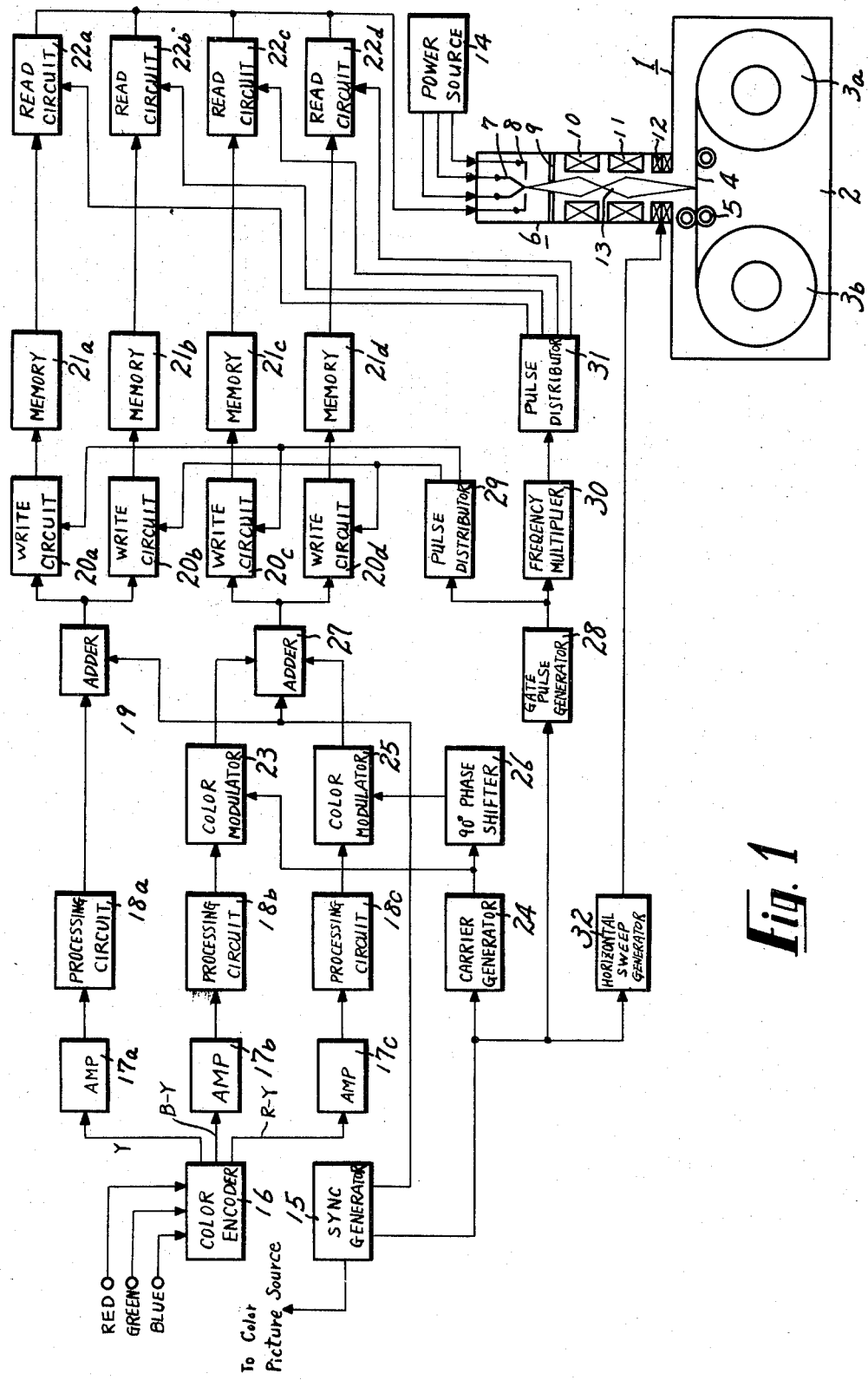
FIG. 1 is a block diagram showing an embodiment of this invention.

Referring to FIG. 1, 1 is an electron beam recorder maintained at a high vacuum by a vacuum pump (not shown). A recording chamber 2 forms part of said electron beam recorder inside of which two reels, a supply reel 3a and a take-up reel 3b are provided. Film 4 loaded on the supply reel 3a is continuously or intermittently conveyed and wound onto the take-up reel 3b via a motor driven capstan 5 in combination with a pressure roller and guide roller. A column 6 forms the other essential part of the electron beam recorder 1 inside of which an electron gun comprising a filament 7, control electrode 8 and an anode 9, two condenser lenses 10 and 11, and a deflecting means 12 for scanning the beam 13 are provided for the purpose of emitting and forming said beam 13.

A power source 14 supplies heating current and a negative high voltage to the filament 7, said source also supplying a bias voltage to the control electrode 8 in order to intercept the electron beam 13 except when a picture information signal is being applied to the control electrode 8. A synchronizing generator 15 feeds synchronous pulses into a color picture source such as a television camera. Red, green and blue color picture information signals from said color picture source are fed into a color encoder 16 in which said signals are converted into a brightness signal (usually designated the Y signal) and two color difference signals R-Y (red minus the brightness signal) and B-Y (blue minus the brightness signal). The Y signal is amplified by the Y amplifier 17a, processed for preemphasis and gamma correction by a processing circuit 18a and then fed into an adder 19 which adds the Y signal and the blanking, horizontal synchronizing and vertical synchronizing signals from the synchronizing generator 15. After which, the added output signal is fed into write circuits 20a and 20b.

Similarly, the color difference signal B-Y is amplified by the B-Y amplifier 17b and processed for preemphasis and gamma correction by a second processing circuit 18b. In this case, however, the processed signal is fed into a color modulator 23 in order to amplitude modulate the color carrier signal sin $\omega t$ fed from the carrier generator 24 which is controlled by the synchronizing generator 15.

Further, the color difference signal R-Y is amplified by the R-Y amplifier 17c, processed for preemphasis and gamma correction by a third processing circuit 18c and fed into a second color modulator 25 in order to amplitude modulate the color carrier signal cos $\omega t$ fed from the carrier generator 24 via a 90° phase shifter 26. The outputs of the color modulators 23 and 25 and the blanking signal from the synchronizing generator 15 are then added by the adder 27, the output of which is fed into write circuits 20c and 20d.

The output of the gate pulse generator 28 which operates in accordance with the output of the synchronizing generator 15 is distributed by a pulse distributor 29 so as to alternately operate write circuits 20a and 20c and write circuits 20b and 20d during the period in which the color picture source makes a horizontal scan. By so doing, the Y signals and color signals passed through the write circuits 20a, 20b, 20c and 20d are alternately stored in memories 21a and 21c and memories 21b and 21d in accordance with the above scanning sequence.

At the same time, the output frequency of the gate pulse generator 28 is doubled by a frequency multiplier 30 and successively fed to read circuits 22a, 22c, 22b and 22d in that order, via a pulse distributor 31. As a result, the signals stored in the memories are read out in controlled sequence and applied to the control electrode 8 in order to modulate the intensity of the electron beam 13.

Further, since sawtooth current from a horizontal sweep generator 32 synchronized with the synchronizing generator 15 is applied to the deflecting means 12, said beam 13 is made to scan the photographic film 4 transversely. As a result, the Y and color signals are recorded on the film at different transverse positions. Again, since the film is being continuously advanced from the supply reel 3a to the take-up reel 3b via capstan 5 etc., the Y and color signals included in each respective scan of the recording beam are transversely and successively recorded in linear formation on the film. As a result, a series of transverse lines, each equidistantly spaced, are recorded on the film. One transverse line on the film includes side-by-side the Y and color information signals for a single scan of the camera or television CRT.

Figure 2:
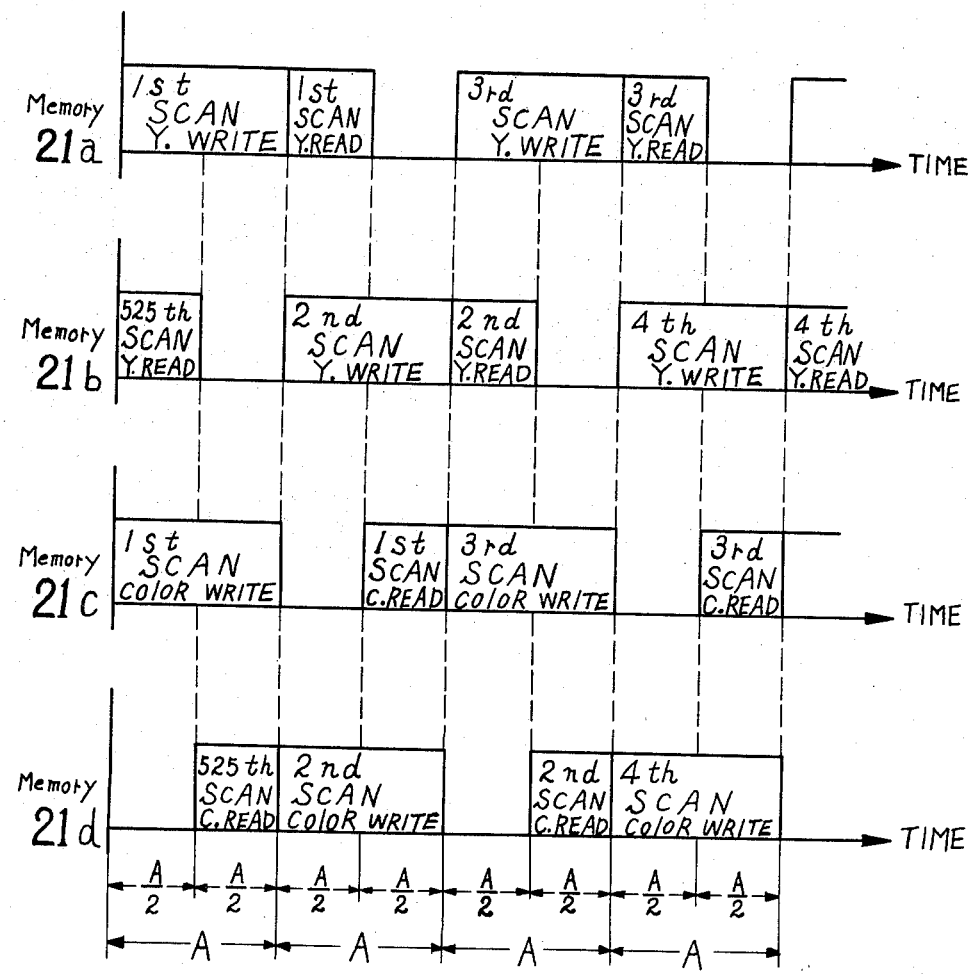
FIG. 2 is a time chart for illustrating the operations of the write circuits, memories and read circuits incorporated in the apparatus according to this invention; and, FIG. 3 is a circuit diagram of a combined write circuit, memory and read circuit according to the invention.

FIG. 2 shows the stored contents of memories 21a, 21b, 21c and 21d in accordance with elapsed time. For instance, during the time the first scan Y and color signals are stored in memories 21a and 21c, both the 525 scan Y signal stored in memories 21b and the 525 scan color signal stored in memory 21d are read out, each read out taking half the time to store the signals.

In this invention, the recorded signals are not limited to Y and color signals only. By incorporating 2n write circuit, memory and read circuit combinations, n varieties signals can be simultaneously produced and recorded at different positions on the photographic film. In this case, the relation between the storing time A (e.g., the time for scanning one horizontal line is $1/15.75 \times 10^3$ sec.) and the read out time $T_k$ of a signal designated K in the n varieties of signals $(I_1 \ldots I_k \ldots I_n)$ is given as follows:

$$T_k = A(r_k/r_1 + \ldots + r_k + \ldots + r_n)$$

where $r_1 \ldots r_k \ldots r_n$ indicate the lengths of the lines to be recorded on the photographic film corresponding to n varieties of signals $I_1 \ldots I_k \ldots I_n$.

Figure 3:
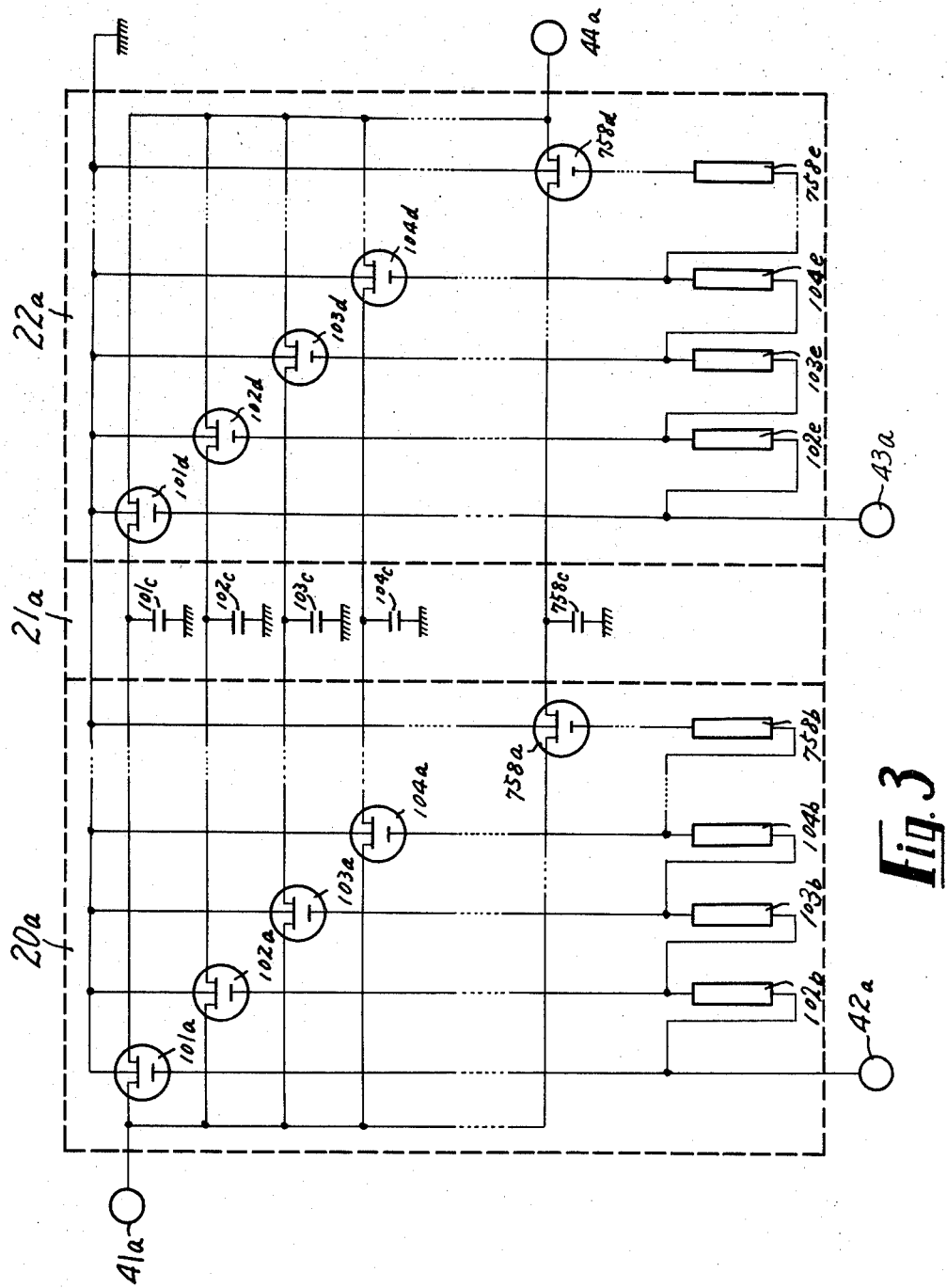

FIG. 3 shows a preferred embodiment of a combined write circuit, memory and read circuit. Since all combinations are identical in arrangement and operation, only a one set combination is shown and, as such, it will suffice in the following description to deal with said one set combination only. Referring to the diagram, the source electrodes of field effect transistors (hereinafter referred to as FET) 101a, 102a, 103a, 104a . . . 758a are connected to terminal 41a, the number of FETs (in this case 658) being determined by the number of picture elements included in one horizontal scanning line.

The gate electrode of FET 101a is connected to terminal 42a, and the gate electrodes of FETs 102a, 103a, 104a . . . 758a are respectively connected to the individual outputs of the 657 delay lines 102b, 103b, 104b . . . 758b which together with terminal 42a are connected in series.

The drain electrodes of said FETs are connected to the 658 condensers 101c, 102c, 103c, 104c . . . 758c of the memory 21a which are in turn respectively connected to the source electrodes of FETs 101d, 102d, 103d, 104d . . . 758d constituting the read circuit 22a.

The gate electrode of FET 101d is connected to terminal 43a and the gate electrodes of FETs 102d, 103d, 104d . . . 758d are respectively connected to the individual outputs of the 657 delay lines 102e, 103e, 104e . . . 758e which together with terminal 43a are connected in series.

The drain electrodes of said FETs 101d, 102d, 103d, 104d . . . 758d are commonly connected to terminal 44a.

In this arrangement, a gate pulse fed from the pulse distributor 29 to the terminal 42a of the write circuit 20a is delayed by delay lines 102b, 103b, 104b . . . 758b in accordance with a predetermined delay time per delay line, said delay time being determined by dividing the horizontal scanning time A of the color picture source by the number of picture elements included in one scan (e.g., $1/15.75 \times 10^3 \times 658$ sec.), where 658 is the number of picture elements in one scan.

As a result, the gates of FETs 101a, 102a, 103a, 104a . . . 758a are opened successively in time sequence so that the Y signal fed from the adder 19 to the terminal 41a is correspondingly stored in the condensers 101c, 102c, 103c, 104c . . . 758c constituting the memory 21a.

Next, the gate pulse fed from the pulse distributor 31 to the terminal 43a of the read circuit 22a is delayed by delay lines 102e, 103e, 104e . . . 758e. In this case, the delay time per delay line is half that of the writing time (e.g., $1/15.75 \times 10^3 \times 658 \times 2$ sec.).

As a result, the gates of FETs 101d, 102d, 103d, 104d . . . 758d are successively opened in time sequence and the stored Y signals are correspondingly read out and fed to the control electrode 8 of the electron beam recorder 1 via the terminal 44a.

Further, upon completion of the read out of each respective memory, the condensers 101c, 102c, 103c... 758c are discharged by an eraser circuit (not shown) thus readying said condensers for the next signal intake.

In accordance with the present invention, the electron beam may be replaced by a laser beam or any other such radiant energy probe.

As mentioned in the aforegoing, since the present invention permits the recording of a plurality of dissimilar signals simultaneously generated on a radiant energy sensitive recording medium at different positions, electron beam distortion attributable to unsymmetrical column arrangement is completely eliminated, thereby ensuring a high degree of recording accuracy.

Having thus described the invention with the detail and particularity as required by the Patent Laws, what is described protected by Letters Patent is set forth in the following claims.

I claim:

1. A method of recording sets of signals, each comprising a plurality of dissimilar simultaneously generated signals at different positions on an elongated radiant energy sensitive recording medium in transverse formation comprising the steps for:
   A. longitudinally conveying said recording medium;
   B. periodically scanning a radiant energy beam in the transverse direction of said recording medium;
   C. storing a first set of signals comprising a plurality of dissimilar signals in a first set of different memories, the number of said memories corresponding to the number of said dissimilar signals included in one line scan of said radiant energy beam;
   D. sequentially reading out of said first set of different memories said stored signals to control the intensity of said radiant energy beam during one scan;
   E. storing the following set of signals comprising a plurality of dissimilar signals in a second set of different memories, the number of said memories corresponding to the number of said dissimilar signals, said signals being generated during the reading out time of the stored signals in said first set of memories (step D);
   F. alternately storing and reading out of said first and second sets of memories to control the intensity of said beam during succeeding scans.

2. A recording method according to claim 1 in which the plurality of dissimilar signals to be recorded are the brightness and color signals forming part of a television signal.

3. A recording method according to claim 1 in which the plurality of dissimilar signals to be recorded are the picture information and sound signals forming part of a television signal.

4. A recording method as defined in claim 1 in which the plurality of dissimilar signals to be recorded are the brightness, color and sound signals forming part of a television signal.

5. A recording method according to claim 1 in which the reading out time of the respective stored dissimilar signals $I_1 \ldots I_k \ldots I_n$ is determined by the following equation:

$$T_k = A(r_k/r_{r1} + \ldots + r_k + \ldots + r_n)$$

where $T_k \ldots$ the reading out time of the signal $I_k$
$A \ldots$ the horizontal line scanning time
$r_k \ldots$ the length of the recorded line of the signal $I_k$.

6. An apparatus for recording a plurality of dissimilar simultaneously generated signals at different positions on an elongated radiant energy sensitive recording medium in transverse formation comprising:
   A. a circuit for generating a synchronizing pulse;
   B. two sets of plural memorizing means corresponding to the number of said dissimilar signals, one set being used for storing said plurality of signals while the other set is being used for reading out the preceding signals, each memorizing means including:
      i. a write circuit for storing said plurality of signals within a predetermined period of time, said time synchronizing with said synchronizing pulse;
      ii. a read circuit for reading out the stored signals within a predetermined period of time, synchronized with said synchronizing pulse;
   C. an electron beam recorder comprising:
      i. an electron gun including a control electrode for controlling the intensity of said electron beam in accordance with the output of said read circuits;
      ii. a means for conveying said recording medium longitudinally.

* * * * *